(12) United States Patent
Xie et al.

(10) Patent No.: US 9,798,411 B2
(45) Date of Patent: Oct. 24, 2017

(54) TOUCH DISPLAY PANEL AND TOUCH DISPLAY DEVICE CAPABLE OF IMPROVING YIELD RATE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan (CN)

(72) Inventors: Jianxing Xie, Shenzhen (CN); Yao-Li Huang, Shenzhen (CN); Chun-Hung Huang, Shenzhen (CN)

(73) Assignees: SHENZHEN CHINA STAR OPTOELECTRONICS TECHNOLOGY CO., LTD., Shenzen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 189 days.

(21) Appl. No.: 14/648,946

(22) PCT Filed: Apr. 2, 2015

(86) PCT No.: PCT/CN2015/075804
§ 371 (c)(1),
(2) Date: Jun. 2, 2015

(87) PCT Pub. No.: WO2016/145682
PCT Pub. Date: Sep. 22, 2016

(65) Prior Publication Data
US 2017/0038882 A1 Feb. 9, 2017

(30) Foreign Application Priority Data
Mar. 18, 2015 (CN) .......................... 2015 1 0118232

(51) Int. Cl.
*G06F 3/041* (2006.01)
*G06F 3/044* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC . G06F 3/0416; G06F 3/0412; G02F 1/133514
(Continued)

(56) References Cited

U.S. PATENT DOCUMENTS

2010/0194707 A1\* 8/2010 Hotelling .............. G06F 3/0412
345/173
2013/0162570 A1\* 6/2013 Shin ........................ G06F 3/041
345/173

FOREIGN PATENT DOCUMENTS

| CN | 102841718 A | 12/2012 |
|---|---|---|
| CN | 102945106 A | 2/2013 |
| KR | 20120078099 A | 7/2012 |

\* cited by examiner

*Primary Examiner* — Jonathan Blancha
(74) *Attorney, Agent, or Firm* — Sughrue Mion, PLLC

(57) ABSTRACT

A touch display panel and a touch display device are disclosed, and the touch display panel includes a color filter substrate, an array substrate, a liquid crystal layer, a thin film transistor array layer, a common electrode layer, a sensing layer and a pixel electrode layer. The thin film transistor array layer, the common electrode layer, the sensing layer and the pixel electrode layer are separated from each other through a dielectric layer, respectively. The touch display panel and the touch display device have a simpler production process and a higher yield rate.

14 Claims, 3 Drawing Sheets

(51) Int. Cl.
*G02F 1/1333* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC .. *G02F 1/133514* (2013.01); *G02F 1/134309* (2013.01); *G02F 1/136286* (2013.01); *G06F 3/041* (2013.01); *G06F 3/044* (2013.01); *G06F 3/0412* (2013.01); *G02F 2001/134372* (2013.01); *G02F 2201/121* (2013.01); *G02F 2201/123* (2013.01); *G06F 2203/04111* (2013.01); *G06F 2203/04112* (2013.01)

(58) Field of Classification Search
USPC .......................................................... 345/173
See application file for complete search history.

TOUCH DISPLAY PANEL AND TOUCH DISPLAY DEVICE CAPABLE OF IMPROVING YIELD RATE

CROSS REFERENCE TO RELATED APPLICATIONS

This application is a National Stage of International Application No. PCT/CN2015/075804 filed Apr. 2, 2015, claiming priority based on Chinese Patent Application No. 201510118232.1, filed Mar. 18, 2015, the contents of all of which are incorporated herein by reference in their entirety.

FIELD OF THE INVENTION

The present invention relates to a technical field of displays, and more particularly to a touch display panel and a touch display device.

BACKGROUND OF THE INVENTION

Along with the popularity of intelligent electronic products, capacitive touch display devices are now widely used in various electronic products, for example, intelligent mobile phones or tablets. Existing capacitive touch display devices includes G-G (glass-glass, transducer glass-tempered glass), GF (glass-film), GFF (glass-film-film) and OGS (one glass solution) plug-in architectures etc., and On cell (touch transducers disposed on a display panel) and In cell (touch transducers embedded on a display panel) embedded architecture etc.

In recent years, people have pursued thin-type devices, so that the three techniques of OGS, On cell, and In cell complete each other. Due to the unique advantages of the production process, the In cell is thinner and has better transmittance; thus, the In cell technique has become the main stream for display panels.

For traditional In cell capacitive touch display panels, sensing circuits and driving circuits are disposed on the same one metal layer. The sensing circuits and driving circuits are connected to touch pixels of different layers by through-holes so as to have a more complex production process and a lower yield rate.

Therefore, it is necessary to provide a touch display panel and a touch display device to solve the above described problems.

SUMMARY OF THE INVENTION

An object of the present invention is to provide a touch display panel and a touch display device which have a simpler production process and a higher yield rate so as to solve more complex production process and lower yield rate problems of the existing touch display panel and the existing touch display device.

To solve the problems described above, the technical solution of the present invention is as follows.

A touch display panel is provided in an embodiment of the present invention, and comprises:
a color filter substrate;
an array substrate;
a liquid crystal layer disposed between the color filter substrate and the array substrate;
wherein the array substrate includes:
a thin film transistor array layer having thin film transistors to transmit scan signals and data signals;
a common electrode layer disposed on the thin film transistor array layer, wherein the common electrode layer is used to provide common signals and receive touch signals, and includes a driving portion, a sensing portion and a common signal portion;
a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer; and
a pixel electrode layer connected to the thin film transistor through a first through-hole;
wherein the thin film transistor array layer, the common electrode layer, the sensing layer, and the pixel electrode layer are separated from each other through a dielectric layer, respectively;
wherein the adjacent driving circuits which transmit the same one touch driving signal are connected to the same one driving portion of the common electrode layer through a second through-hole; and
wherein the adjacent sensing circuits which receive the same one touch sensing signal are connected to the same one sensing portion of the common electrode layer through a third through-hole.

In the touch display panel of the present invention, the common electrode layer further includes a common signal communication portion; and the common signal portions of the same one common line are connected to each other through the corresponding common signal communication portion.

In the touch display panel of the present invention, the sensing layer is formed with the sensing circuits in a metal-mesh configuration.

In the touch display panel of the present invention, when the touch display panel is in a display mode, a driving chip provides the common signals to all of the common signal portions of the common electrode layer through connecting the common signal communication portion of each of the common signal portions; and the driving chip provides the common signal to all of the driving portions of the common electrode layer through the driving circuits.

In the touch display panel of the present invention, when the touch display panel is in a touch mode, a touch chip progressively transmits the touch driving signal to each of the driving portions of the common electrode layer through the driving circuits; and each of the sensing portions of the common electrode layer simultaneously transmits the touch sensing signal to the touch chip through the sensing circuits.

In the touch display panel of the present invention, the sensing circuits of the sensing layer are disposed over the common signal portion.

A touch display panel is provided in an embodiment of the present invention, and comprises:
a color filter substrate;
an array substrate;
a liquid crystal layer disposed between the color filter substrate and the array substrate;
wherein the array substrate includes:
a thin film transistor array layer having thin film transistors to transmit scan signals and data signals;
a common electrode layer disposed on the thin film transistor array layer, wherein the common electrode layer is used to provide common signals and receive touch signals, and includes a driving portion, a sensing portion and a common signal portion;

a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer; and a pixel electrode layer connected to the thin film transistor through a first through-hole;

wherein the thin film transistor array layer, the common electrode layer, the sensing layer, and the pixel electrode layer are separated from each other through a dielectric layer, respectively.

In the touch display panel of the present invention, the adjacent driving circuits which transmit the same one touch driving signal are connected to the same one driving portion of the common electrode layer through a second through-hole.

In the touch display panel of the present invention, the adjacent sensing circuits which receive the same one touch sensing signal are connected to the same one sensing portion of the common electrode layer through a third through-hole.

In the touch display panel of the present invention, the common electrode layer further includes a common signal communication portion; and the common signal portions of the same one common line are connected to each other through the corresponding common signal communication portion.

In the touch display panel of the present invention, the sensing layer is formed with the sensing circuits in a metal-mesh configuration.

In the touch display panel of the present invention, when the touch display panel is in a display mode, a driving chip provides the common signals to all of the common signal portions of the common electrode layer through connecting the common signal communication portion of each of the common signal portions; and the driving chip provides the common signal to all of the driving portions of the common electrode layer through the driving circuits.

In the touch display panel of the present invention, when the touch display panel is in a touch mode, a touch chip progressively transmits the touch driving signal to each of the driving portions of the common electrode layer through the driving circuits; and each of the sensing portions of the common electrode layer simultaneously transmits the touch sensing signal to the touch chip through the sensing circuits.

In the touch display panel of the present invention, the sensing circuits of the sensing layer are disposed over the common signal portion.

A touch display device is provided in an embodiment of the present invention, and comprises a backlight source and a touch display panel, wherein the touch display panel includes:

a color filter substrate;

an array substrate;

a liquid crystal layer disposed between the color filter substrate and the array substrate;

wherein the array substrate includes:

a thin film transistor array layer having thin film transistors to transmit scan signals and data signals;

a common electrode layer disposed on the thin film transistor array layer, wherein the common electrode layer is used to provide common signals and receive touch signals, and includes a driving portion, a sensing portion, and a common signal portion;

a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer; and a pixel electrode layer connected to the thin film transistor through a first through-hole;

wherein the thin film transistor array layer, the common electrode layer, the sensing layer, and the pixel electrode layer are separated from each other through a dielectric layer, respectively.

In the touch display device of the present invention, the adjacent driving circuits which transmit the same one touch driving signal are connected to the same one driving portion of the common electrode layer through a second through-hole.

In the touch display device of the present invention, the adjacent sensing circuits which receive the same one touch sensing signal are connected to the same one sensing portion of the common electrode layer through a third through-hole.

In the touch display device of the present invention, the common electrode layer further includes a common signal communication portion; and the common signal portions of the same one common line are connected to each other through the corresponding common signal communication portion.

In the touch display device of the present invention, the sensing layer is formed with the sensing circuits in a metal-mesh configuration.

In the touch display panel of the present invention, the sensing circuits of the sensing layer are disposed over the common signal portion.

Through setting a sensing layer and a common electrode layer, a touch display panel and a touch display device of the present invention can implement transmissions of common signals and touch signals so as to have a simpler production process and a higher yield rate; the present solves the more complex production process and the lower yield rate problem of the existing touch display panel and the existing touch display device.

To allow the above description of the present invention to be more clear and comprehensive, there are preferred embodiments with the accompanying figures described in detail below.

DETAILED DESCRIPTION OF THE PREFERRED EMBODIMENTS

Figure 1:
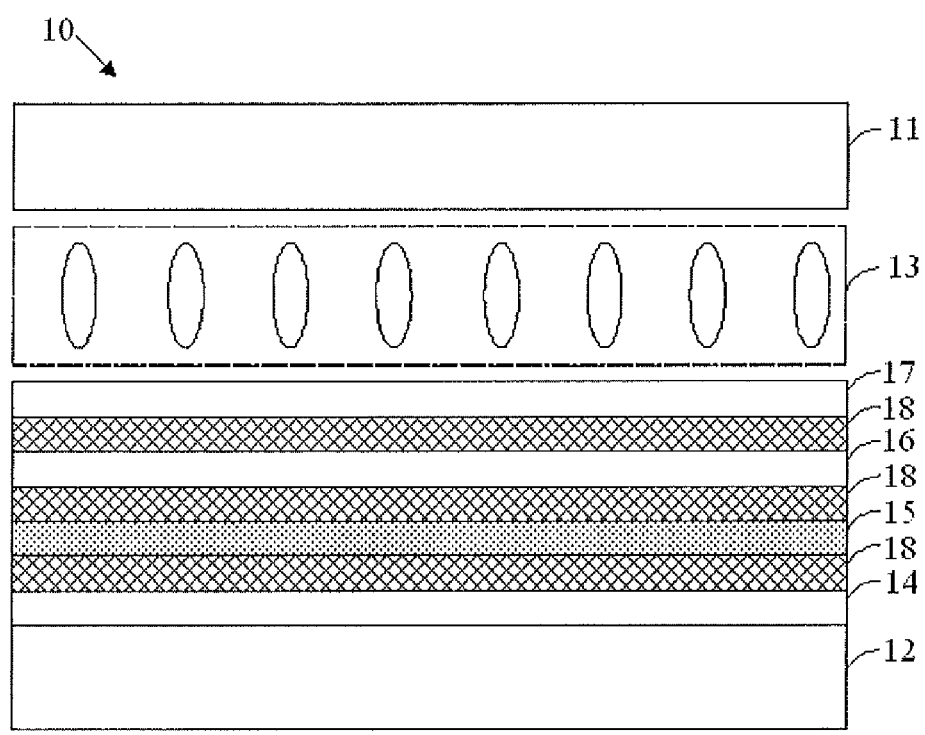
FIG. 1 is a structural diagram of a touch display panel according to the preferred embodiment of the present invention.

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

In the drawings, units with similar structures are represented with the same label.

Refer to FIG. 1, which is a structural diagram of a touch display panel according to the preferred embodiment of the present invention. A touch display panel 10 of the present preferred embodiment includes a color filter substrate 11, an array substrate 12, and a liquid crystal layer 13. The array substrate 12 includes a thin film transistor array layer 14, a common electrode layer 15, a sensing layer 16 and a pixel electrode layer 17 thereon; the thin film transistor array layer 14 has thin film transistors to transmit scan signals and data signals. The common electrode layer 15 is disposed on the thin film transistor array layer 14. The common electrode layer 15 is used to provide common signals and receive touch signals, and includes a driving portion 151, a sensing portion 152, common signal portions 153, and a common signal communication portion 154. The common signal portions 153 of the same one common line are connected to each other through the common signal communication portion 154. The sensing layer 16 is disposed on the common electrode layer 15, and comprises driving circuits 161 and sensing circuits 162, wherein the driving circuits 161 which transmit the same one touch driving signal are connected to each other through the driving portion 151 of the common electrode layer 15, and the sensing circuits 162 which receive the same one touch sensing signal are connected to each other through the sensing portion 152 of the common electrode layer 15. The pixel electrode layer 17 is connected to the thin film transistor of the thin film transistor array layer 14 through a first through-hole (not illustrated). The thin film transistor array layer 14, the common electrode layer 15, the sensing layer 16 and the pixel electrode layer 17 are separated from each other through a dielectric layer 18, respectively.

Figure 2:
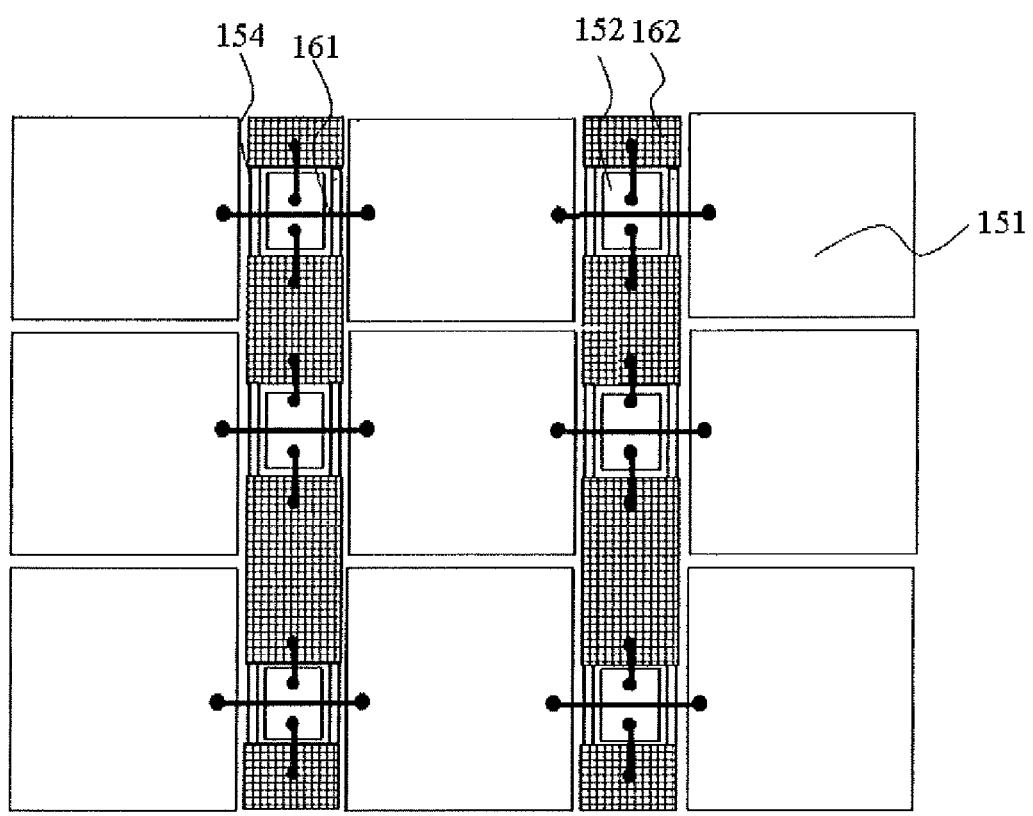
FIG. 2 is a structural top view of a sensing layer and a common electrode layer of a touch display panel according to the preferred embodiment of the present invention.
Figure 3:
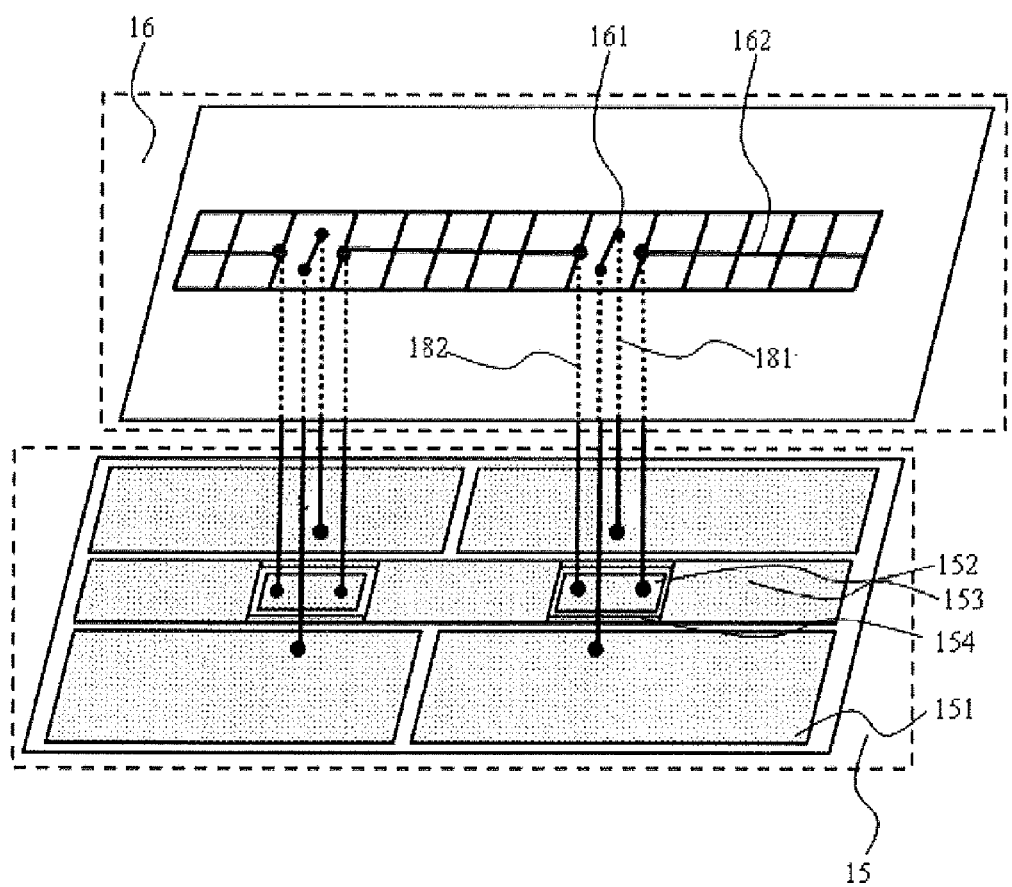
FIG. 3 is a perspective structural diagram of a sensing layer and a common electrode layer of a touch display panel according to the preferred embodiment of the present invention.

Referring to FIG. 2 and FIG. 3, FIG. 2 is a structural top view of a sensing layer and a common electrode layer of a touch display panel according to the preferred embodiment of the present invention, and FIG. 3 is a perspective structural diagram of a sensing layer and a common electrode layer of a touch display panel according to the preferred embodiment of the present invention. In the touch display panel 10 of the present preferred embodiment, the adjacent driving circuits 161 which transmit the same one touch driving signal, namely, the same one column of the driving circuits 161, are connected to the same one driving portion 151 of the common electrode layer 15 through a second through-hole 181 of the dielectric layer 18, so as to ensure that the touch driving signals can transmit to each of driving portions 151 of the common electrode layer 15 of the touch display panel 10. In the touch display panel 10, the adjacent sensing circuits 162 which receive the same one touch sensing signal, namely, the same one row sensing circuits 162, are connected to the same one sensing portion 152 of the common electrode layer 15 through a third through-hole 182 of the dielectric layer 18, so as to ensure that the touch sensing signals which are produced by each of sensing portions 152 of the common electrode layer 15 can be transmitted to the external touch chip.

When the touch display panel 10 of the present preferred embodiment is used, if the touch display panel 10 is in a display mode, a driving chip inputs the common signal to the common electrode layer 15. The driving chip provides the common signals to all of the common signal portion 153 of the common electrode layer 15 through connecting the common signal communication portion 154 of each of the common signal portions 153; at the same time, the driving chip provides the common signal to all of the driving portions 151 of the common electrode layer 15 through the driving circuits 161. At this time, the sensing portion of the common electrode layer 15 is suspended. Since most area of the common electrode layer has common signals, the touch display penal 10 can execute a display operation normally.

If the touch display panel 10 is in a touch mode, a touch chip progressively transmits the touch driving signal to each of the driving portions 151 of the common electrode layer 15 through the driving circuits 161, and each of the sensing portions 152 of the common electrode layer 15 simultaneously transmits the touch sensing signal to the touch chip through the sensing circuits 162. Therefore, the whole detection process of touch operation is completed. At this time, the common signal portion 153 of the common electrode layer 15 and the common signal communication portion 154 are both suspended.

In the present preferred embodiment, the sensing circuits 162 of the sensing layer 16 are disposed over the common signal portion 153, and the sensing circuits 162 are in a metal-mesh configuration. When the touch display panel 10 is in a touch mode, the suspended common signal portion 153 is coupled to the metal-mesh configuration sensing circuits 162 of the sensing layer 16, so as to add the signal sensing volume of the sensing circuits 162 and add the signal noise ratio of the touch sensing signal.

Through setting a sensing layer and a common electrode layer, a touch display panel and a touch display device of the present invention can implement transmissions of common signals and touch signals so as to have a simpler production process and a higher yield rate.

A touch display device is further provided in the present invention, and comprises a backlight source and a touch display panel. The touch display panel includes a color filter substrate, an array substrate, and a liquid crystal layer disposed between the color filter substrate and the array substrate.

The array substrate is formed with a thin film transistor array layer, a common electrode layer, a sensing layer and a pixel electrode layer thereon; and the thin film transistor array layer has thin film transistors to transmit scan signals and data signals. The common electrode layer is disposed on the thin film transistor array layer and used to provide common signals and receive touch signals, and the common electrode layer includes a driving portion, a sensing portion, a common signal portion, and a common signal communication portion. The common signal portions of the same one common line are connected to each other through the corresponding common signal communication portion. The sensing layer is disposed on the common electrode layer, and comprises driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer. The pixel electrode layer is connected to the thin film transistor through a first through-hole. The thin film transistor array layer, the common electrode layer, the sensing layer, and the pixel electrode layer are separated from each other through a dielectric layer, respectively.

Preferably, the adjacent driving circuits which transmit the same one touch driving signal are connected to the same one driving portion of the common electrode layer through a second through-hole.

Preferably, the adjacent sensing circuits which receive the same one touch sensing signal are connected to the same one sensing portion of the common electrode layer through a third through-hole.

Preferably, the sensing circuits of the sensing layer are disposed over the common signal portion in a metal-mesh configuration.

The specific operational principles of the touch display device of the present invention are the same as or similar to the related descriptions of the preferred embodiments of the above touch display panel. Please refer to the related descriptions of the preferred embodiments of the above touch display panel.

Through setting a sensing layer and a common electrode layer, a touch display panel and a touch display device of the present invention can implement transmissions of common signals and touch signals so as to have a simpler production process and a higher yield rate; the present solves the more complex production process and the lower yield rate problem of the existing touch display panel and the existing touch display device.

In summary, the present invention has been disclosed with preferred embodiments thereof, but the above described preferred embodiments are not intended to limit the present invention. Those who are skilled in the art can make many changes and modifications to the described embodiment which can be carried out without departing from the scope and the spirit of the invention that is intended to be limited only by the appended claims.

What is claimed is:

1. A touch display panel capable of improving a yield rate, comprising:
    a color filter substrate;
    an array substrate;
    a liquid crystal layer disposed between the color filter substrate and the array substrate;
    wherein the array substrate includes:
    a thin film transistor array layer having thin film transistors to transmit scan signals and data signals;
    a common electrode layer disposed on the thin film transistor array layer, wherein the common electrode layer is used to provide common signals and receive touch signals, and includes a driving portion, a sensing portion and a common signal portion;
    a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer, wherein the sensing layer is formed with the sensing circuits in a metal-mesh configuration; and
    a pixel electrode layer connected to the thin film transistor through a first through-hole, wherein the pixel electrode layer is disposed on the sensing layer, and the sensing circuits of the sensing layer are disposed right over the common signal portion;
    wherein the thin film transistor array layer, the common electrode layer, the sensing layer and the pixel electrode layer are separated from each other through a dielectric layer, respectively;
    wherein the adjacent driving circuits which transmit the same one touch driving signal are connected to the same one driving portion of the common electrode layer through a second through-hole; and
    wherein the adjacent sensing circuits which receive the same one touch sensing signal are connected to the same one sensing portion of the common electrode layer through a third through-hole.

2. The touch display panel capable of improving a yield rate according to claim 1, wherein the common electrode layer further includes a common signal communication portion; and the common signal portions of the same one common line are connected to each other through the corresponding common signal communication portion.

3. The touch display panel capable of improving a yield rate according to claim 2, wherein when the touch display panel is in a display mode, a driving chip provides the common signals to all of the common signal portions of the common electrode layer through connecting the common signal communication portion of each of the common signal portions; and the driving chip provides the common signal to all of the driving portions of the common electrode layer through the driving circuits.

4. The touch display panel capable of improving a yield rate according to claim 1, wherein when the touch display panel is in a touch mode, a touch chip progressively transmits the touch driving signal to each of the driving portions of the common electrode layer through the driving circuits; and each of the sensing portions of the common electrode layer simultaneously transmits the touch sensing signal to the touch chip through the sensing circuits.

5. A touch display panel capable of improving a yield rate, comprising:
    a color filter substrate;
    an array substrate;
    a liquid crystal layer disposed between the color filter substrate and the array substrate;
    wherein the array substrate includes:
    a thin film transistor array layer having thin film transistors used to transmit scan signals and data signals;
    a common electrode layer disposed on the thin film transistor array layer, wherein the common electrode layer is used to provide common signals and receive touch signals, and includes a driving portion, a sensing portion and a common signal portion;
    a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer, wherein the sensing layer is formed with the sensing circuits in a metal-mesh configuration; and
    a pixel electrode layer connected to the thin film transistor through a first through-hole, wherein the pixel electrode layer is disposed on the sensing layer, and the sensing circuits of the sensing layer are disposed right over the common signal portion;
    wherein the thin film transistor array layer, the common electrode layer, the sensing layer and the pixel electrode layer are separated from each other through a dielectric layer, respectively.

6. The touch display panel capable of improving a yield rate according to claim 5, wherein the adjacent driving circuits which transmit the same one touch driving signal are connected to the same one driving portion of the common electrode layer through a second through-hole.

7. The touch display panel capable of improving a yield rate according to claim 5, wherein the adjacent sensing circuits which receive the same one touch sensing signal are connected to the same one sensing portion of the common electrode layer through a third through-hole.

8. The touch display panel capable of improving a yield rate according to claim 5, wherein the common electrode layer further includes a common signal communication portion; and the common signal portions of the same one common line are connected to each other through the corresponding common signal communication portion.

9. The touch display panel capable of improving a yield rate according to claim 8, wherein when the touch display panel is in a display mode, a driving chip provides the common signals to all of the common signal portions of the common electrode layer through connecting the common signal communication portion of each of the common signal portions; and the driving chip provides the common signal to all of the driving portions of the common electrode layer through the driving circuits.

10. The touch display panel capable of improving a yield rate according to claim 5, wherein when the touch display panel is in a touch mode, a touch chip progressively transmits the touch driving signal to each of the driving portions of the common electrode layer through the driving circuits; and each of the sensing portions of the common electrode layer simultaneously transmits the touch sensing signal to the touch chip through the sensing circuits.

11. A touch display device capable of improving a yield rate, comprising a backlight source and a touch display panel, wherein the touch display panel includes:
a color filter substrate;
an array substrate;
a liquid crystal layer disposed between the color filter substrate and the array substrate;
wherein the array substrate includes:
a thin film transistor array layer having thin film transistors used to transmit scan signals and data signals;
a common electrode layer disposed on the thin film transistor array layer, wherein the common electrode layer is used to provide common signals and receive touch signals, and includes a driving portion, a sensing portion and a common signal portion;
a sensing layer disposed on the common electrode layer, and comprising driving circuits and sensing circuits, wherein the driving circuits which transmit the same one touch driving signal are connected to each other through the driving portion of the common electrode layer, and the sensing circuits which receive the same one touch sensing signal are connected to each other through the sensing portion of the common electrode layer, wherein the sensing layer is formed with the sensing circuits in a metal-mesh configuration; and
a pixel electrode layer connected to the thin film transistor through a first through-hole, wherein the pixel electrode layer is disposed on the sensing layer, and the sensing circuits of the sensing layer are disposed right over the common signal portion;
wherein the thin film transistor array layer, the common electrode layer, the sensing layer and the pixel electrode layer are separated from each other through a dielectric layer, respectively.

12. The touch display device capable of improving a yield rate according to claim 11, wherein the adjacent driving circuits which transmit the same one touch driving signal are connected to the same one driving portion of the common electrode layer through a second through-hole.

13. The touch display device capable of improving a yield rate according to claim 11, wherein the adjacent sensing circuits which receive the same one touch sensing signal are connected to the same one sensing portion of the common electrode layer through a third through-hole.

14. The touch display device capable of improving a yield rate according to claim 11, wherein the common electrode layer further includes a common signal communication portion; and the common signal portions of the same one common line are connected to each other through the corresponding common signal communication portion.

* * * * *